Dec. 15, 1931.　　　A. M. DOUGLAS　　　1,837,026
TREE CARRIER
Filed May 8, 1930　　　2 Sheets-Sheet 1
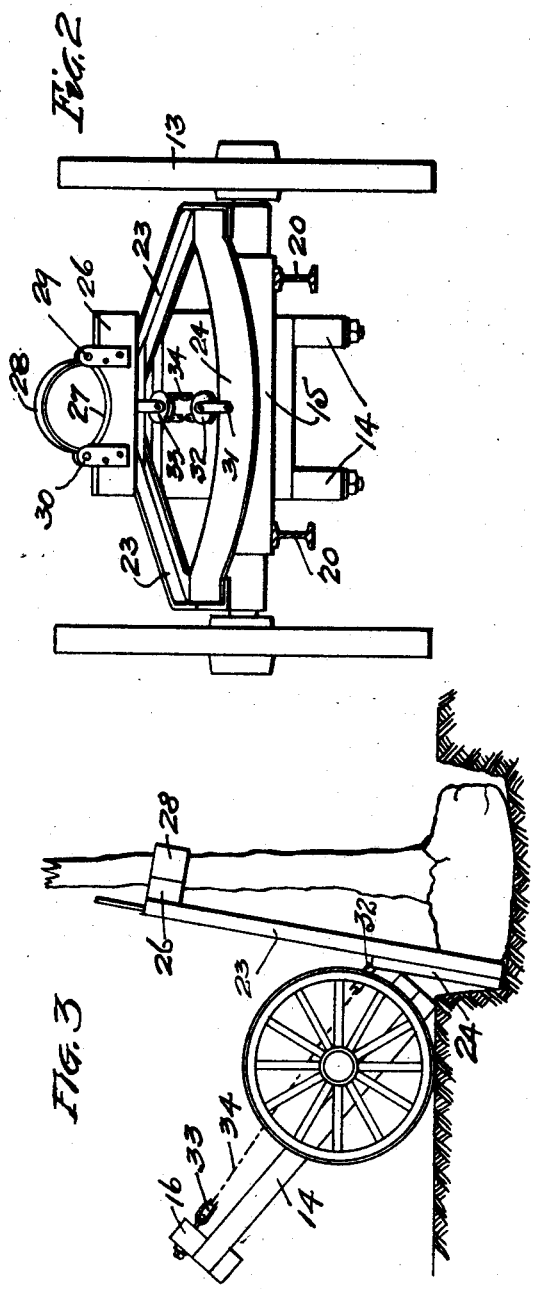
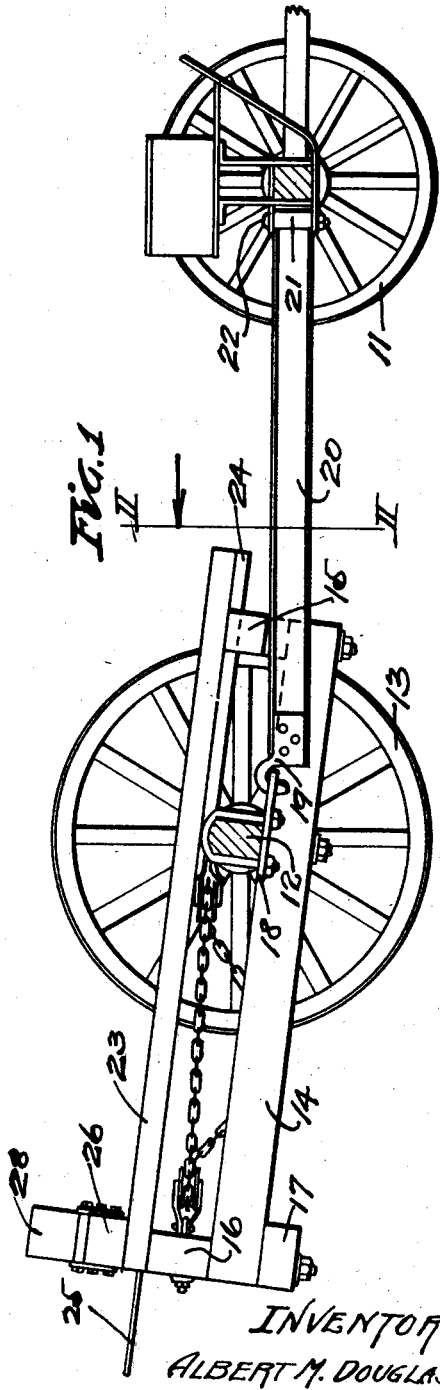
INVENTOR
ALBERT M. DOUGLAS
by J. W. Weatherford
ATTORNEY.

Dec. 15, 1931.  A. M. DOUGLAS  1,837,026
TREE CARRIER
Filed May 8, 1930   2 Sheets-Sheet 2

INVENTOR
ALBERT M. DOUGLAS
by J. N. Weatherford
ATTORNEY

Patented Dec. 15, 1931

1,837,026

UNITED STATES PATENT OFFICE

ALBERT M. DOUGLAS, OF MEMPHIS, TENNESSEE

TREE CARRIER

Application filed May 8, 1930. Serial No. 450,640.

This invention relates to machines for moving trees for transplanting and has especial reference to a machine which will move the tree with the least possible disturbance to its roots and the ball of earth surrounding them. It has further reference to the simplification of such a device whereby the rear axle and dipper assembly thereon may be readily detached from the remainder of the machine for positioning in relation to the tree and for the loading of the tree thereon, and to an independent dipper assembly for such a structure which may be secured to the tree, and thereafter be properly supported on and positioned with relation to such axle so that the proper balance may be had for transportation of the tree.

The objects of this invention are:—

(a) To provide means whereby an independent tree carrying dipper may be supported on a wheel axle assembly and may be readily adjusted after loading for balancing the load relative to said axle; and during loading or unloading may be entirely free from such axle;

(b) To provide a reach detachable from and adjustable to said rear axle and as readily detachable from and detachable to a front axle, which reach will support and anchor the dipper assembly for transportation; and (c) To improve and simplify the design and construction of such a device.

The means by which the foregoing and other objects are accomplished and the manner of their accomplishment will readily be understood from the following specification on reference to the accompanying drawings, in which:

Fig. 1 is a side elevation of the carrier assembled with the nearer wheels removed to more clearly show the remaining portions of the device.

Fig. 2 is a sectional elevation on the line II—II of Fig. 1, looking rearwardly.

Fig. 3 is a side elevation on a very much reduced scale showing the manner in which the dipper swings entirely free of the carrying wheels when initially positioned for loading a tree.

Figure 4:
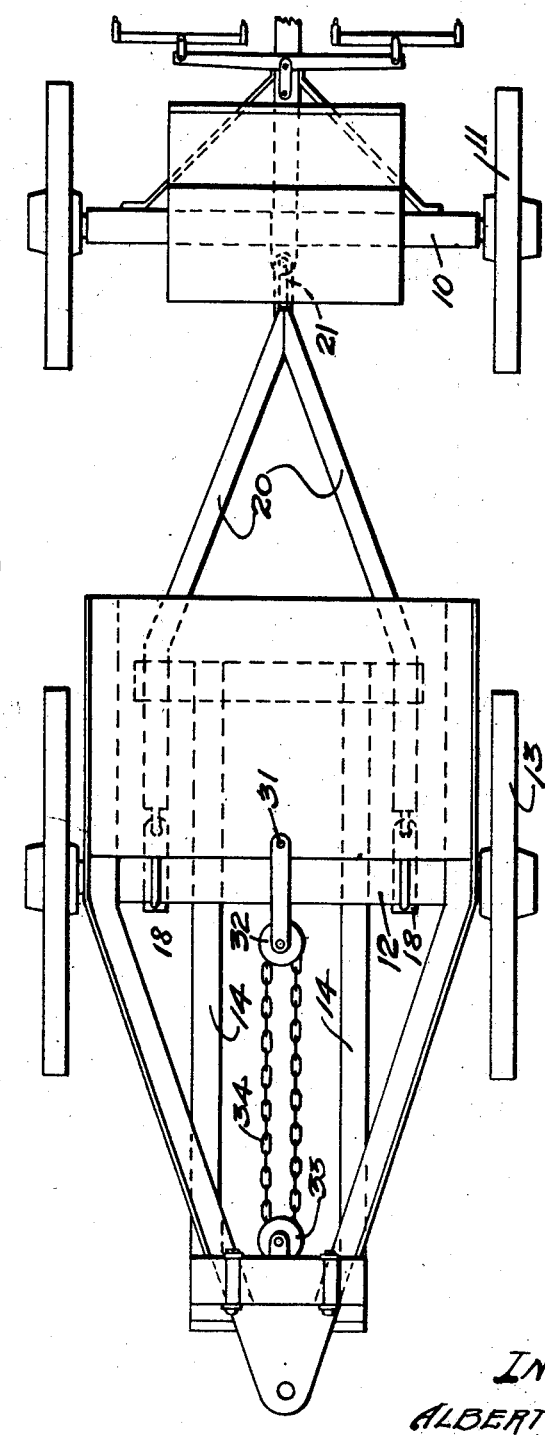
Fig. 4 is a plan view of the machine.

Referring now to the drawings in which the various parts are referred to by numerals, the machine as a whole is a four wheel truck having a front axle 10, and wheels 11; a rear axle 12 and wheels 13. The front axle is provided with the usual tongue and draft rigging. Secured to the rear axle 12 are a pair of parallel members 14 which are preferably disposed below the axle and secured thereto in any usual or desired manner. These members extend forwardly beyond the axle and support transverse blocking 15 which is rigidly bolted to them. They also extend rearwardly behind the axle and at their rear ends carry transverse blocks 16 and 17 which likewise are securely bolted to them, this structure will hereafter be designated as the rear axle assembly. Secured to the underside of the axle 12 and outwardly disposed from these members 14 are plates 18 provided at their forward ends with suitable holes with which hooks 19, on the rear ends of a pair of reach members 20, engage. At the forward end these reach members are provided with a U-shaped loop 21 which loop is engaged by a pin 22 to attach the forward end of the reach to the front axle.

It will be seen that the axle 12 may be disconnected from the reach by unhooking the hooks 19 from the plates 18 and that it may be disconnected from the front axle by removing the pin 22. It will further be seen that when the front and rear axles are connected by the reach, the block 15 resting on the reach members will support the forward ends of members 14 which is necessary when the wagon is empty by reason of the weight of the dipper and when loaded is necessary because the root end of the tree is always so positioned that the reach must carry and transmit to the front axles a portion of the load.

Resting on the rear axle but entirely free therefrom are two angle iron members 23 between the forward ends of which a pan or dipper 24 is secured. 25 is a triangular plate which is disposed between the rear ends of these dipper members and secured to them, and 26 a transverse block which rests on and is likewise secured to these members. This transverse block is hollowed out at 27 to receive the trunk of the tree and is ordinarily padded to prevent bruising thereof. 28 is a loop or strap of thin material, hinged at 29 to the block 26 and connected at the opposite end by a detachable pin 30 thereto. The pan or dipper 24 is preferably bowed down in the center where it receives the ball of dirt of the tree. This structure will hereinafter be designated a dipper assembly.

Detachably connected to the rear end of the pan 24 as by a pin or bolt 31 is a chain block 32. A corresponding block 33 is secured to the cross member 16. 34 is the chain. The two blocks and chains are intended as illustrative of any of the well known types of such devices.

In using the device the carrier is brought adjacent to the tree and the reach members detached from the rear axle. A trench is dug around the tree to such depth as may be desired and under-cut in usual manner to prepare the tree with a ball of dirt around the roots for removal. The rear axle assembly and the dipper assembly thereon are next brought adjacent the hole thus dug, the rear end of the assemblies is allowed to kick up, the dipper is lowered into the hole adjacent the tree and the chain block detached. The entire detachment of the pan assembly permits its adjustment with regard to the tree and its easy attachment thereto. After such adjustment the trunk of the tree is secured in the saddle of the block 26 and secured thereto by the strap 28 and additional fastenings such as chains or ropes are placed around the trunk at any desired points to complete such attachment. At such stage of the proceedings the tree may be pulled over by ropes or otherwise until in a leaning position in the hole. The rear axle assembly may then be placed adjacent the diper assembly, the chain blocks connected to the pan and a direct backward pull be exerted to bring these parts together. If necessary after the first pull is made blocking may be put in the hole beneath the ball of the tree, an additional hitch made, and the dipper and tree be then pulled to place on the axle, this pull being continued until the tree is so nearly balanced that a downward pull by hand on the trunk will raise the root end. Thereafter the axle assembly and its load is moved rearwardly and turned away from the hole. Preferably the forward end of the reach is detached from the front axle, the trunk of the tree is pulled downward to raise the root end and the hooks on the rear ends of the reach are engaged. With the rear axle attached the front axle may be properly positioned and the forward end of the reach connected thereto.

When so loaded the tree is moved to such new positon as is desired. The forward end of the reach is disconnected and the rear end thereafter disconnected after which the rear axle assembly and dipper assembly thereon, are properly adjusted relative to the hole dug to receive the tree and the dipper assembly with the tree thereon permitted to tip up and slide into the hole. The rear axle assembly may then be moved and the tree straightened up after which detachment of the dipper assembly from the tree may be made. The importance of the independence of the dipper assembly in connection with its sliding movement across the axle will clearly be seen, in that such independence and sliding movement permits the proper adjustment of the tree and its lowering into the hole dug for it. It obviates dropping the tree into the hole which must occur where the tree is detached from the dipper assembly prior to placing the tree in the hole.

Having described my invention, what I claim is:

In a tree carrier having a detachable reach, a tree engaging assembly, comprising a wheeled axle, longitudinal beams disposed below said axle, means supporting said beams from said axle, transverse members supported on and secured to opposite ends of said beams, the forward member having its top arcuately hollowed out, said members together with said axle forming a dipper-assembly-support, and said forward member extending laterally beyond said beams, to provide reach-engaging ends, a dipper assembly, comprising a transversely arcuate pan conforming to said hollowed surface resting on and guided thereby, a pair of dipper arms secured to the lateral edges of said pan converging rearwardly therefrom and having their rear ends secured together, said arms resting on and supported by said axle and the rear one of said members, an arcuately chambered block secured to the top of the rear ends of said arms, and means engaging the rear one of said members and said pan for traversing said dipper assembly rearwardly relative to said supports.

In testimony whereof I hereunto affix my signature.

ALBERT M. DOUGLAS.